US012712403B2

(12) United States Patent
Fujiwara et al.

(10) Patent No.: US 12,712,403 B2
(45) Date of Patent: Aug. 18, 2026

(54) STATOR

(71) Applicant: TDK Corporation, Tokyo (JP)

(72) Inventors: Ryogen Fujiwara, Tokyo (JP); Nobuyuki Shimbo, Tokyo (JP)

(73) Assignee: TDK Corporation, Tokyo (JP)

( * ) Notice: Subject to any disclaimer, the term of this patent is extended or adjusted under 35 U.S.C. 154(b) by 145 days.

(21) Appl. No.: 18/685,401

(22) PCT Filed: Aug. 25, 2022

(86) PCT No.: PCT/JP2022/032022
§ 371 (c)(1),
(2) Date: Feb. 21, 2024

(87) PCT Pub. No.: WO2023/027141
PCT Pub. Date: Mar. 2, 2023

(65) Prior Publication Data

US 2025/0239903 A1 Jul. 24, 2025

(30) Foreign Application Priority Data

Aug. 26, 2021 (JP) ................................ 2021-138228

(51) Int. Cl.
*H02K 3/26* (2006.01)

(52) U.S. Cl.
CPC ........... *H02K 3/26* (2013.01); *H02K 2203/03* (2013.01)

(58) Field of Classification Search
CPC ....... H02K 3/26; H02K 2203/03; H02K 3/522
See application file for complete search history.

(56) References Cited

U.S. PATENT DOCUMENTS 4,645,961 A * 2/1987 Malsky .................. H02K 37/14 310/216.115
5,099,162 A 3/1992 Sawada
5,389,908 A 2/1995 Sawada
6,275,319 B1 * 8/2001 Gadhok ................ H02K 33/00 359/198.1
2007/0194641 A1 8/2007 Kanatani et al.
2009/0002117 A1 1/2009 Kawarai
2010/0007230 A1 1/2010 Suzuki et al.
2019/0149002 A1 5/2019 Kim et al.

FOREIGN PATENT DOCUMENTS

JP H03-065041 A 3/1991
JP H06-253481 A 9/1994
JP 2746596 B2 5/1998

(Continued)

OTHER PUBLICATIONS

International Search Report issued Nov. 8, 2022 in Application No. PCT/JP2022/032022.

(Continued)

*Primary Examiner* — Tulsidas C Patel
*Assistant Examiner* — Mohammed Ahmed Qureshi
(74) *Attorney, Agent, or Firm* — Faegre Drinker Biddle & Reath LLP

(57) ABSTRACT

In the motor, since the housing of the stator is made of soft magnetic material, magnetic resistance decreases, and interlinkage magnetic fluxes of the print coil wiring increase. Therefore, a high rotational torque is realized in the motor to which the stator is applied.

8 Claims, 7 Drawing Sheets

(56) References Cited

FOREIGN PATENT DOCUMENTS

| | | | |
|---|---|---|---|
| JP | 2000-262017 | A | 9/2000 |
| JP | 2007-228706 | A | 9/2007 |
| JP | 2009-009985 | A | 1/2009 |
| JP | 2010-041907 | A | 2/2010 |
| JP | 2014-176151 | A | 9/2014 |
| JP | 2019-047613 | A | 3/2019 |
| WO | WO-2012/142165 | A2 | 10/2012 |
| WO | WO-2019/044713 | A1 | 3/2019 |

OTHER PUBLICATIONS

Extended European Search Report issued Jun. 26, 2025 in Application No. 22861429.3.
International Preliminary Report on Patentability issued Mar. 7, 2024 in Application No. PCT/JP2022/032022.

* cited by examiner

STATOR

CROSS-REFERENCE TO RELATED APPLICATIONS

This application is a 35 U.S.C. § 371 national phase application of PCT/JP2022/032022, filed on Aug. 25, 2022, which claims priority to Japanese Patent Application No. 2021-138228, filed on Aug. 26, 2021.

TECHNICAL FIELD

The present disclosure relates to a stator used in a motor.

BACKGROUND ART

According to reduction in size and thickness of devices, a motor mounting on the devices is required to be further reduced in size and thickness. Generally, a stator of the motor is configured by winding a coil around a soft magnetic core. Patent Document 1 below discloses a technique for reducing the motor in size by configuring a stator using a flexible printed circuit board including a coil.

CITATION LIST

Patent Literature

Patent Literature 1: Japanese Patent Application Publication No. 1994-253481

SUMMARY OF INVENTION

Technical Problem

In the above-described stator according to the background art, the base material constituting the flexible printed circuit board is made of a non-magnetic material such as polyimide resin. The non-magnetic material has high magnetic resistance and magnetic fluxes are difficult to pass through the non-magnetic material. Therefore, it is difficult to obtain a practically sufficient motor torque.

It is an object of the present disclosure to provide a stator capable of improving motor torque.

Solution to Problem

A stator according to an aspect of the present disclosure is used in a motor including a magnetized shaft-shaped rotor and a cylindrical stator, and the rotor is inserted through the stator, the stator includes a cylindrical housing made of a soft magnetic material, and print coil wiring provided on an inner surface of the housing.

In the stator, the magnetic resistance of the magnetic path of the motor decreases due to the housing made of a soft magnetic material, and the magnetic flux interlinking the printed coil increases. Therefore, the motor torque can be improved by applying the stator to the motor.

In a stator according to another aspect, the stator further includes teeth provided on the inner surface of the housing and made of a soft magnetic material, wherein the print coil wiring is disposed around the teeth.

In a stator according to another aspect, an internal diameter of the housing is 3 mm or less.

In a stator according to another aspect, the stator further includes a flexible printed circuit board provided with the print coil wiring, wherein the flexible printed circuit board is attached to the inner surface of the housing.

In a stator according to another aspect, a thickness of the flexible printed circuit board is 500 μm or less.

In a stator according to another aspect, a main component of a base material of the flexible printed circuit board is polyimide resin, PET resin, or LCP resin.

In a stator according to another aspect, a base material of the flexible printed circuit board is made of magnetic powder-containing resin.

In a stator according to another aspect, the stator further includes a soft magnetic body and a flexible printed circuit board provided on a main surface of the soft magnetic body and provided with a printed coil wiring.

Advantageous Effects of Invention

According to the present disclosure, a stator improving motor torque is provided.

DESCRIPTION OF EMBODIMENTS

Figure 1:
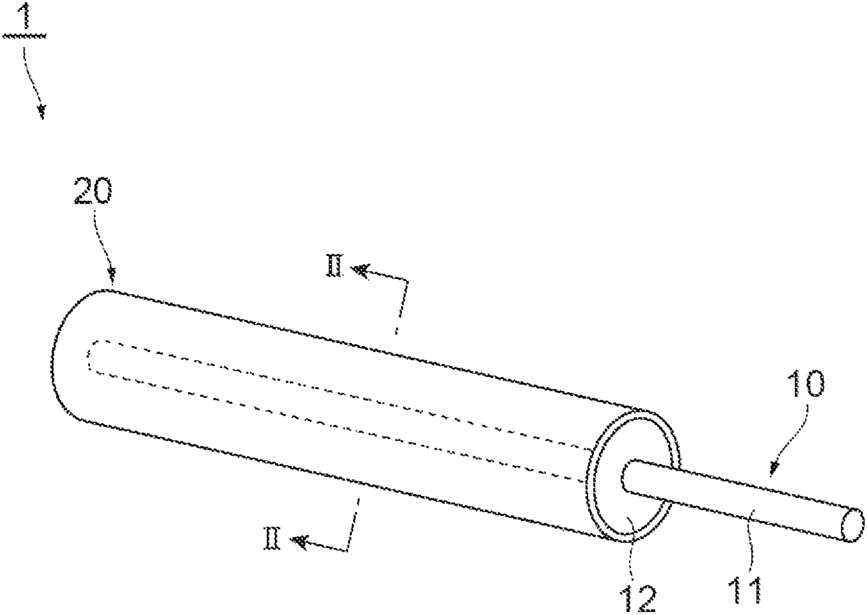
FIG. 1 is a schematic perspective view of a motor according to one embodiment.

Hereinafter, embodiments of the present disclosure will be described in detail with reference to the accompanying drawings. In the description, the same reference numerals are used for the same elements or elements having the same functions, and redundant description will be omitted.

First, the configuration of a motor 1 according to one embodiment will be described with reference to FIGS. 1 and 2.

The motor 1 consists of a rotor 10 having a shaft 11 and a magnet 12, and a stator 20. The magnet 12 in the rotor 10 is formed partially or wholly on the outer circumferential surface of the shaft 11, and disposed on the inner peripheral side of the stator 20 with a gap. The motor 1 is a micromotor designed to have, for example, a length between both ends of the shaft 11 of 4 to 30 mm (15 mm as an example) and an outer diameter of the stator 20 of 0.5 to 5 mm (2 mm as an example).

The rotor 10 has a shaft-like outer shape elongated in one direction and has an axis (rotational axis) parallel to the extending direction. In the present embodiment, the shaft 11 has an elongated columnar shape. The magnet 12 has a cylindrical shape surrounding the outer circumferential surface of the shaft 11. The magnet 12 is magnetized in the radial direction along the axis of easy magnetization. As shown in FIG. 2, the magnet 12 may be configured to have two poles on its surface, or may be configured to have four poles or eight poles on its surface. The configuration of the rotor 10 according to the present embodiment can be realized by covering the outer circumferential surface of the shaft 11 made of metal (for example, Co) with a thin-film magnet (for example, $SmCo_5$) formed by using a molten salt immersion method or the like.

The stator 20 has a cylindrical outer shape through which the rotor 10 can be inserted. As shown in FIG. 2, the stator 20 includes a housing 22 and print coil wiring 28 provided in the housing 22. In the present embodiment, the print coil wiring 28 is provided in the housing 22 in the form of a flexible printed circuit board 24.

The housing 22 has a cylindrical shape. The housing 22 according to the present embodiment is designed to have, for example, an outer diameter of 0.5 to 5 mm (2 mm as an example), an internal diameter of 0.3 to 3 mm (1.8 mm as an example), a thickness of 0.05 to 0.2 mm (0.1 mm as an example), and a length of 4 to 30 mm (14 mm as an example). The housing 22 is made of a soft magnetic material, and may be made of, for example, ferritic stainless steel (SUS430 or the like), an electromagnetic steel plate, permalloy, or nickel.

Figure 3:
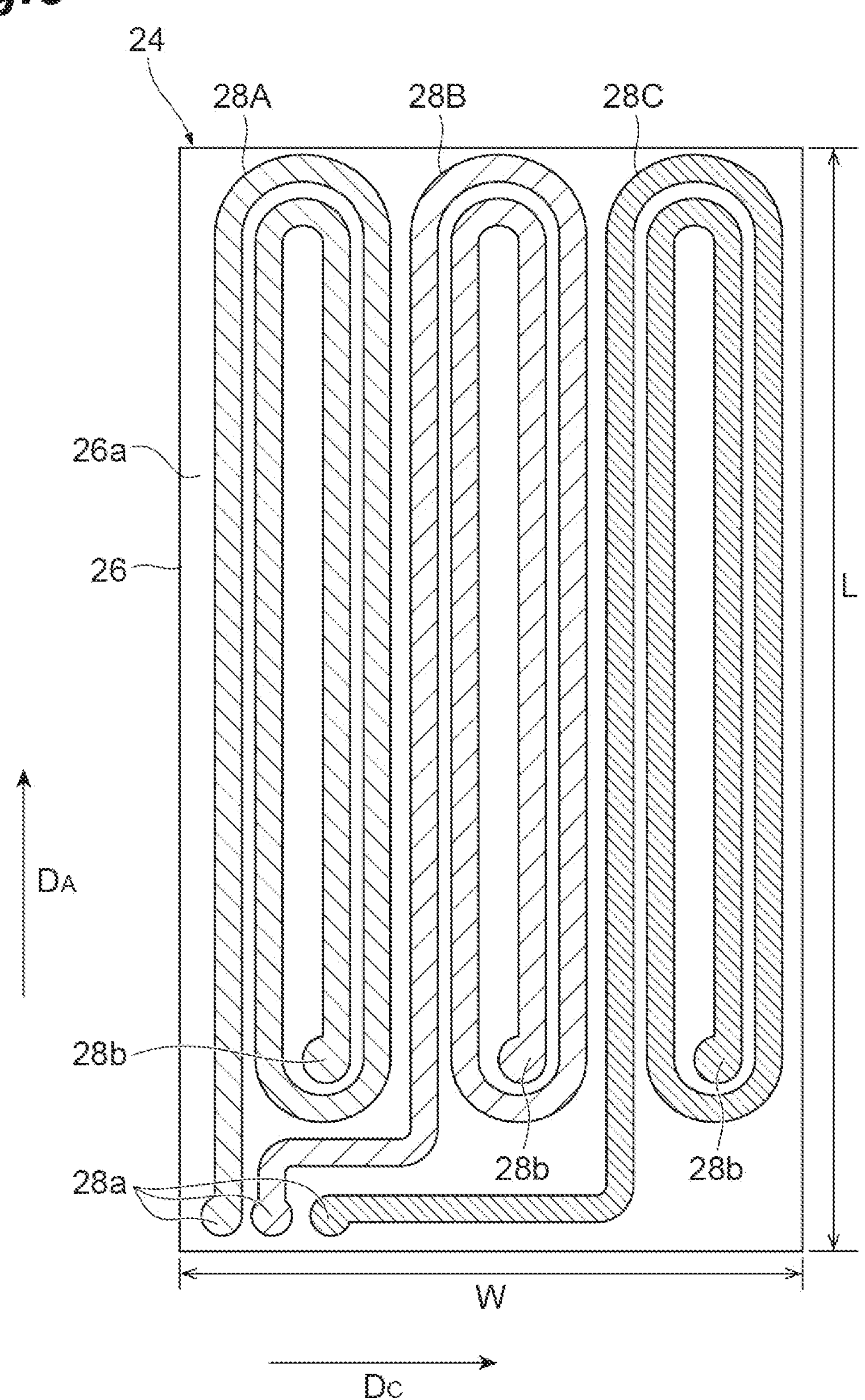
FIG. 3 is a developed view of the flexible printed circuit board shown in FIG. 2.

As shown in FIG. 3, the flexible printed circuit board 24 includes a sheet-like base material 26 and a plurality of print coil wiring 28 provided on the base material 26. A thickness of the flexible printed circuit board 24 is, for example, 20 to 500 μm (100 μm as an example).

The base material 26 has a rectangular shape and has a length L (axial length) and a width W (circumferential length). The length L is designed to be equal to or less than the length of the housing 22, and is, for example, 12 mm. The width W is designed to be approximately the same as (or slightly shorter than) the circumference of the inner surface 22*a* of the housing 22. A thickness of the base material 26 is, for example, 5 to 100 μm (12 μm as an example). The base material 26 is made of a non-magnetic material. The base material 26 includes resin such as polyimide resin, PET resin, or LCP resin as a main component. In the case where the main component of the base material 26 is a material having a high elastic modulus such as polyimide resin, since the flexible printed circuit board 24 has high rigidity, a large restoring force is generated when the base material 26 is rolled, and thus the flexible printed circuit board 24 can be firmly affixed to the inner surface 22*a* of the housing 22 by the restoring force. In the case where the main component of the base material 26 is a material having a low elastic modulus such as PET resin, the flexible printed circuit board 24 has high flexibility and thus can be easily rolled, and the small-sized stator 20 having a small radius can be formed. In addition, when the main component of the base material 26 is a material excellent in shape retention or a thermoplastic material such as LCP resin, the shape of the base material 26 is easily held in a cylindrical shape, and thus the work in manufacturing the stator 20 is facilitated.

The plural print coil wiring 28 (three print coil wiring in the present embodiment) are provided on the main surface 26*a* of the base material 26. The print coil wiring 28 can be formed by patterning a copper foil, for example. The print coil wiring 28 has 3 to 100 μm (12 μm as an example) thickness and 10 to 300 μm (35 μm as an example) width. The number of print coil wiring 28A, 28B, and 28C (i.e., three in the present embodiment) can be increased or decreased as appropriate, and the number of turns of each print coil wiring 28A, 28B, and 28C (two turns in the present embodiment) can be increased (for example, 10 to 30 turns) or decreased as appropriate. Each of the print coil wiring 28A, 28B, and 28C is an elongated coreless coil extending in the longitudinal direction of the base material 26 (corresponding to the axial direction $D_A$ when the base material 26 is rolled). The print coil wiring 28A, 28B, and 28C have substantially the same shape and dimensions. Three print coil wiring 28A, 28B, and 28C are arranged at predetermined intervals along the widthwise direction of the base material 26 (corresponding to the circumferential direction $D_C$ when the base material 26 is rolled). Each the print coil wiring 28A, 28B, and 28C is electrically connected to a control circuit (not shown) via each outer end portion 28*a*, and a predetermined current can be applied from the control circuit to each the print coil wiring 28A, 28B, and 28C. In addition, jumper lines of the print coil wiring 28A, 28B, and 28C (not shown) are connected by an inner end portion 28*b*, and the print coil wiring 28A, 28B, and 28C form a star connection. By changing the configuration of the jumper lines connecting between the outer end portion 28*a* and the inner end portion 28*b* of the print coil wiring 28A, 28B, and 28C, the print coil wiring 28A, 28B, and 28C may form a delta connection.

Figure 2:
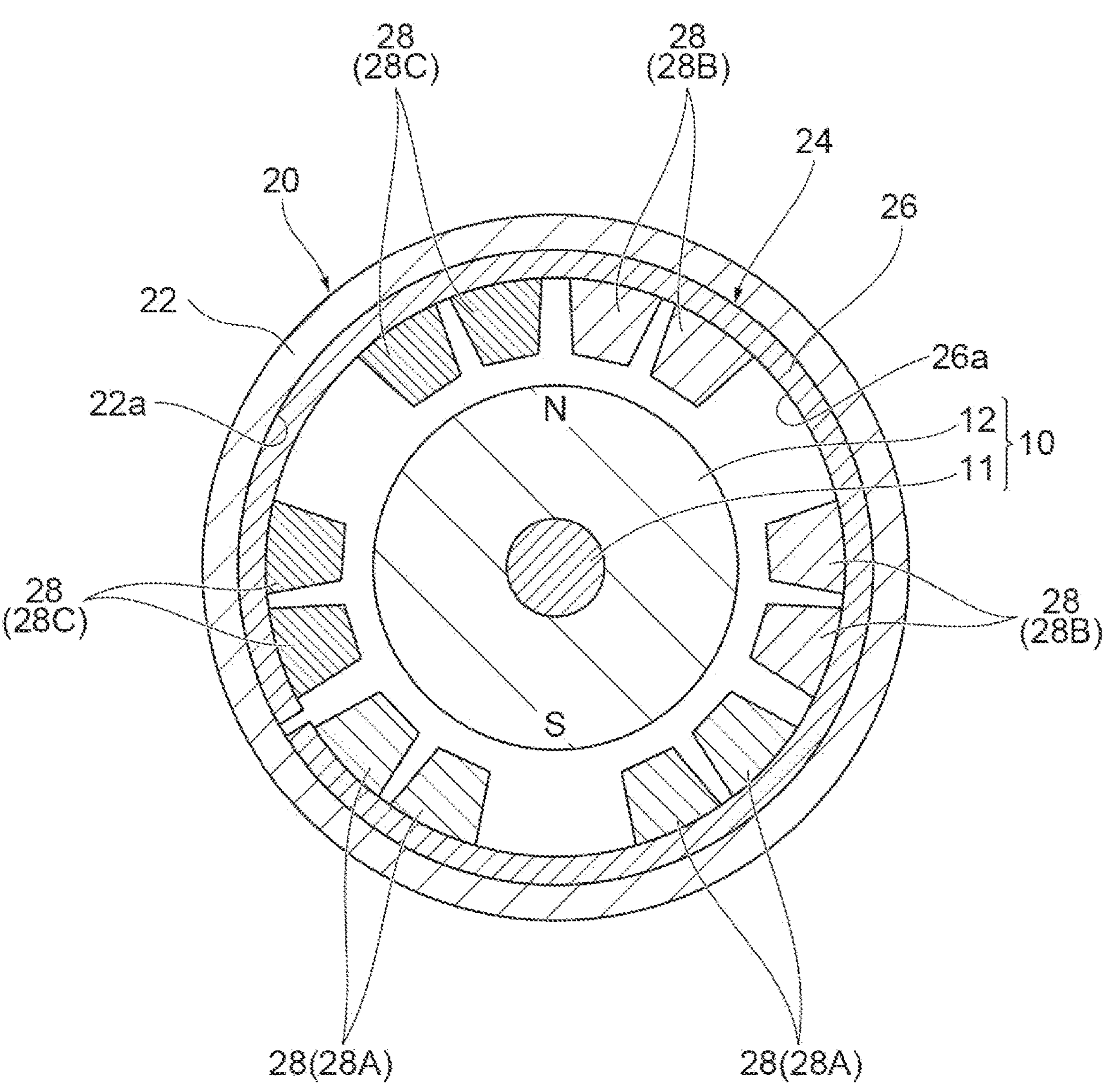
FIG. 2 is a cross-sectional view taken along line II-II of the motor shown in FIG. 1.

As shown in FIG. 2, the flexible printed circuit board 24 is rolled in the circumferential direction $D_C$ so that the main surface 26*a* of the base material 26 provided with the print coil wiring 28 is located inside, and is housed in the housing 22. Then, due to the restoring force of the flexible printed circuit board 24, the flexible printed circuit board 24 is affixed to the inner surface 22*a* of the housing 22 and fixed in position. As a result, three the print coil wiring 28A, 28B, and 28C are arranged inside the stator 20 along the circumferential direction. By setting the width W of the base material 26 to be substantially the same as the circumferential length of the inner surface 22*a* of the housing 22, one roll of the flexible printed circuit board 24 is fitted in the housing 22.

In the above motor 1, by applying current to the print coil wiring 28A, 28B, and 28C from the control circuit at a predetermined timing, the rotor 10 rotates around the axis. At this time, magnetic fluxes are generated around the print coil wiring 28A, 28B, and 28C.

In the above motor 1, since the housing 22 of the stator 20 is made of soft magnetic material, magnetic resistance decreases, and interlinkage magnetic fluxes of the print coil wiring 28A, 28B, and 28C increase. Therefore, high rotational torque is realized in the motor 1 to which the stator 20 is applied.

As the internal diameter of the housing 22 of the stator 20 decreases, the deformation amount of the flexible printed circuit board 24 accommodated in the housing 22 increases and the restoring force of the flexible printed circuit board 24 increases. When the internal diameter of the housing 22 is 3 mm or less, the flexible printed circuit board 24 is firmly affixed to the inner surface 22*a* of the housing 22 by a large restoring force.

By thinning the base material 26 of the flexible printed circuit board 24, the stator 20 and the motor 1 can be downsized. When the thickness of the base material 26 is 100 μm or less, a small motor that is sufficiently small for practical use can be obtained.

In order to find out the relationship between the thickness of the base material of the flexible printed circuit board and the torque, the inventors measured the torque for a plurality of samples having different thicknesses of the base material. The results are shown in Table 1 below. The main component of the base material is polyimide resin, and no magnetic powder is contained in the base material. Six print coil wiring were provided on the main surface of the base material. The magnet used in the experiment had four poles on the surface and was magnetized in the radial direction along the axis of easy magnetization. The shaft of the rotor was made of Co, and the outer circumferential surface of the shaft was covered with a thin-film magnet (in particular, $SmCo_5$ magnet formed by using a molten salt immersion method) that was not in direct contact with the outer circumferential surface. The magnetic film had a thickness of 100 μm, a length of 10 mm in the axial direction, and an external diameter of 10 mm. The housing was made of stainless steel (SUS430 [JIS]), and had a thickness of 0.2 mm and an internal diameter of 3 mm.

TABLE 1

| | Thickness of base material [μm] | Torque [*$10^{-6}$ N/m] | Inner diameter of magnetic film [mm] | Outer diameter of shaft [mm] |
|---|---|---|---|---|
| Sample 1 | 12.5 | 0.430 | 2.2 | 2.1 |
| Sample 2 | 50 | 0.355 | 2.1 | 2 |
| Sample 3 | 100 | 0.298 | 2 | 1.9 |
| Sample 4 | 200 | 0.222 | 1.8 | 1.7 |
| Sample 5 | 500 | 0.117 | 1.2 | 1.1 |
| Sample 6 | 550 | 0.106 | 1.1 | 1 |

In addition, the inventors measured the torque of a plurality of samples having different thicknesses of the base material even in a case where magnetic powder is contained in the base material of the flexible printed circuit board. The results are shown in Tables 2 and 3 below. The main component of the base material is polyimide resin, and the base material contains magnetic powder (in particular, soft magnetic ferrite powder). The permeability (relative permeability) of the base material was 20 for Samples 7 to 12 shown in Table 2 and was 50 for Samples 13 to 18 shown in Table 3. The permeability was measured using an impedance analyzer (KEYSIGHT E4990A).

TABLE 2

| | Thickness of base material [μm] | Torque [*$10^{-6}$ N/m] | Inner diameter of magnetic film | Outer diameter of shaft [mm] |
|---|---|---|---|---|
| Sample 7 | 12.5 | 0.448 | 2.2 | 2.1 |
| Sample 8 | 50 | 0.412 | 2.1 | 2 |
| Sample 9 | 100 | 0.392 | 2 | 1.9 |
| Sample 10 | 200 | 0.353 | 1.8 | 1.7 |
| Sample 11 | 500 | 0.232 | 1.2 | 1.1 |
| Sample 12 | 550 | 0.180 | 1.1 | 1 |

TABLE 3

| | Thickness of base material [μm] | Torque [*$10^{-6}$ N/m] | Inner diameter of magnetic film [mm] | Outer diameter of shaft [mm] |
|---|---|---|---|---|
| Sample 13 | 12.5 | 0.449 | 2.2 | 2.1 |
| Sample 14 | 50 | 0.417 | 2.1 | 2 |
| Sample 15 | 100 | 0.400 | 2 | 1.9 |
| Sample 16 | 200 | 0.364 | 1.8 | 1.7 |
| Sample 17 | 500 | 0.241 | 1.2 | 1.1 |
| Sample 18 | 550 | 0.185 | 1.1 | 1 |

As shown in Tables 1 to 3, it was established that the torque was improved as the base material of the flexible printed circuit board was thinner. In particular, when the base material of the flexible printed circuit board contains or does not contain magnetic powder, it was established that the thinner the base material is, the more the torque is improved. In the case that the base material of the flexible printed circuit board contained magnetic powder, it was established that the torque significantly decreased when the base material was thicker than 500 μm as in the case of Samples 12 and 18. The magnetic powder contained in the base material may be, for example, metal soft magnetic powder or ferrite soft magnetic powder.

The present disclosure is not limited to the above-described embodiment and can be modified in various ways.

For example, the flexible printed circuit board 24 may have the print coil wiring 28 on both surfaces, and the print coil wiring on both surfaces may be conducted in series via a through hole. Since the number of turns of the coil increases, a higher rotational torque can be realized as the motor.

Figure 4:
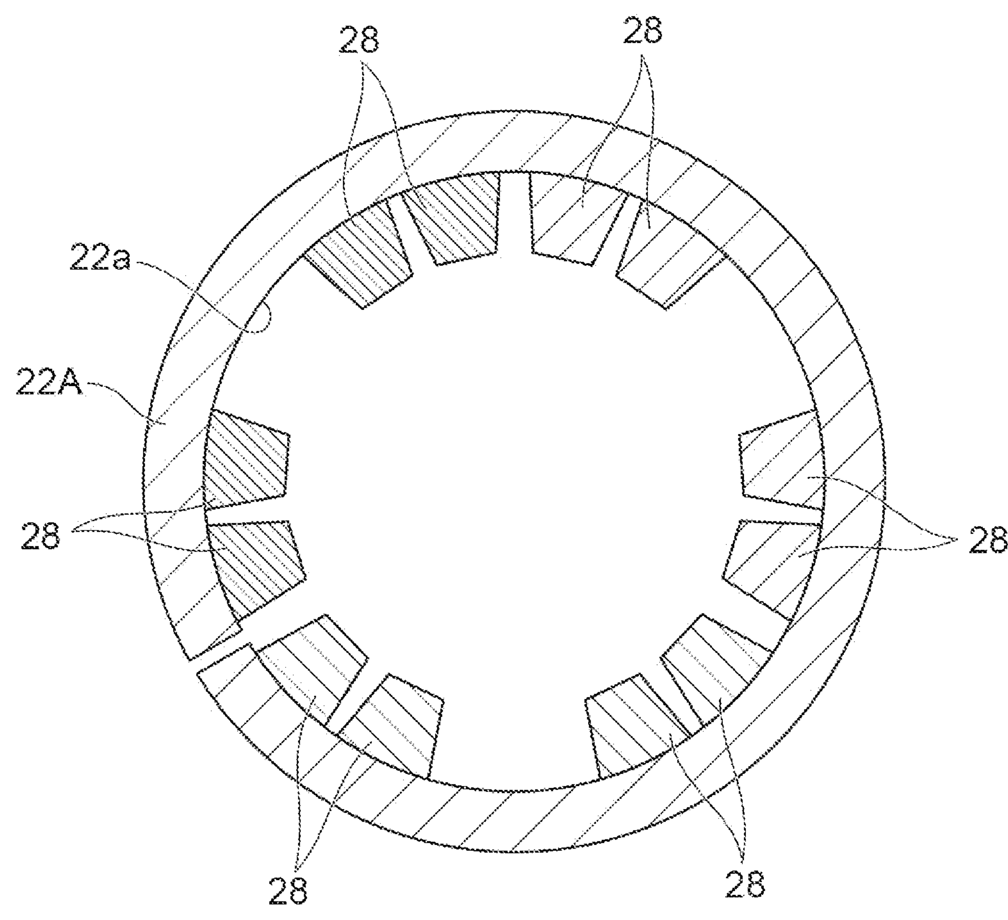
FIG. 4 is a cross-sectional view showing a different embodiment.

For example, as shown in FIG. 4, the print coil wiring 28A, 28B, and 28C may be directly provided on the inner surface 22*a* of a housing 22A. In this case, the housing 22A can be made of soft magnetic material having flexibility (for example, magnetic powder-containing resin). The magnetic powder contained in the housing 22A may be, for example, metal soft magnetic powder or ferrite soft magnetic powder. For example, after the print coil wiring 28A, 28B, and 28C are provided on the housing 22A in a sheet state, the housing 22A may be rolled into a cylindrical shape. According to the embodiment shown in FIG. 4, since the housing 22A is made of soft magnetic material having small magnetic resistance, interlinkage magnetic fluxes of the print coil wiring 28A, 28B, and 28C increase. Therefore, it is possible to realize a higher rotational torque by applying it to the motor 1. The housing 22A may be entirely made of soft magnetic material, or may be partially made of non-magnetic material and the remaining part made of soft magnetic material.

Figure 5:
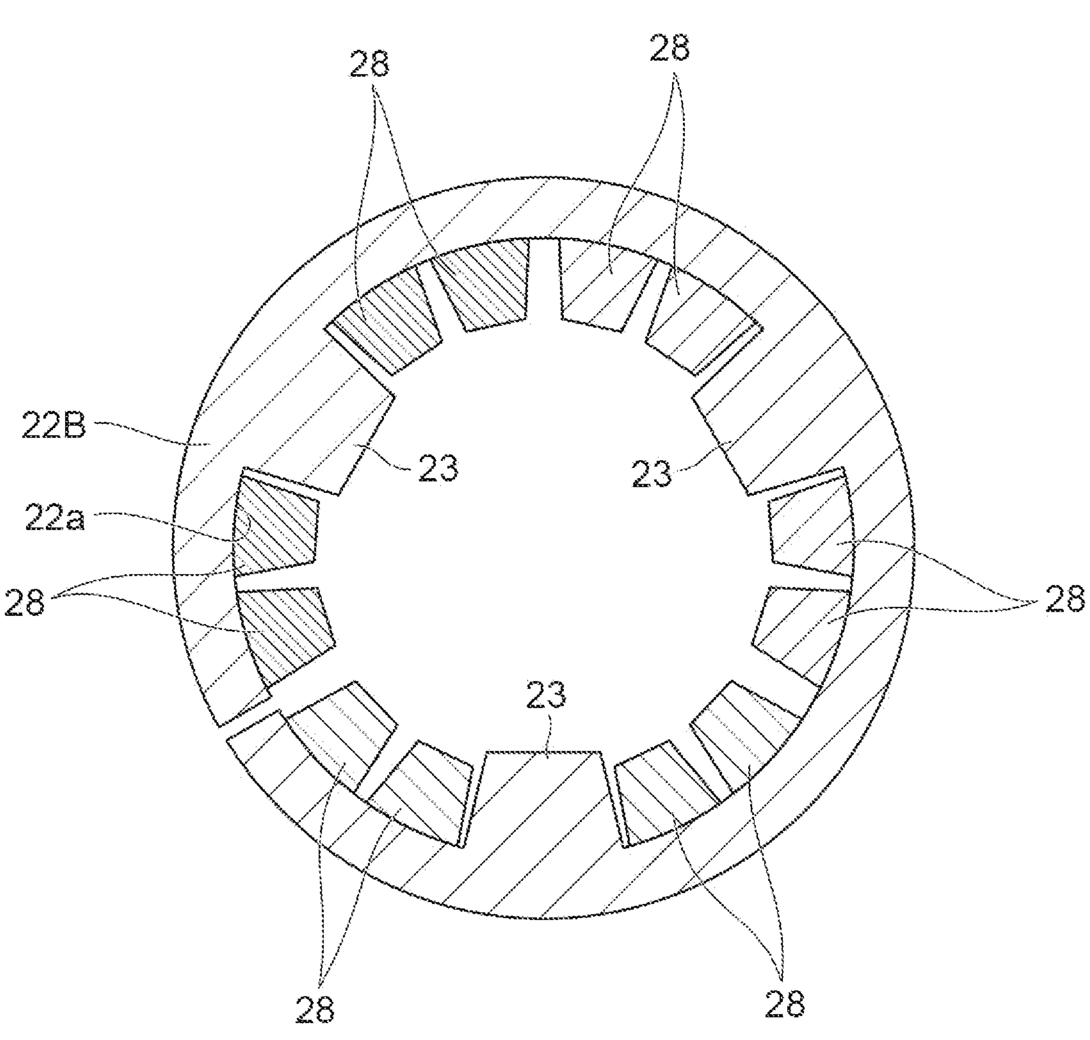
FIG. 5 is a cross-sectional view showing a different embodiment.
Figure 6:
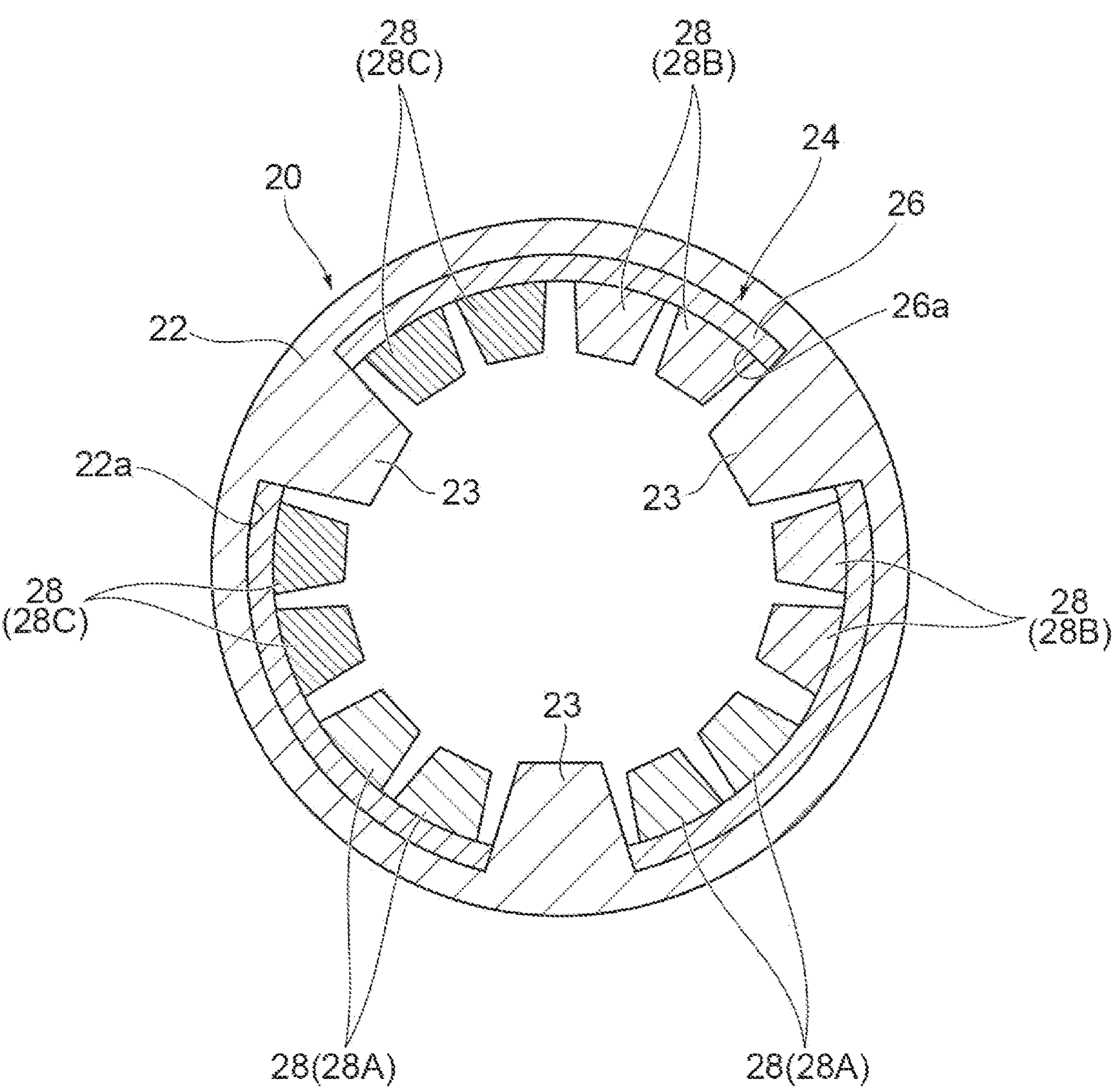
FIG. 6 is a cross-sectional view showing a different embodiment.
Figure 7:
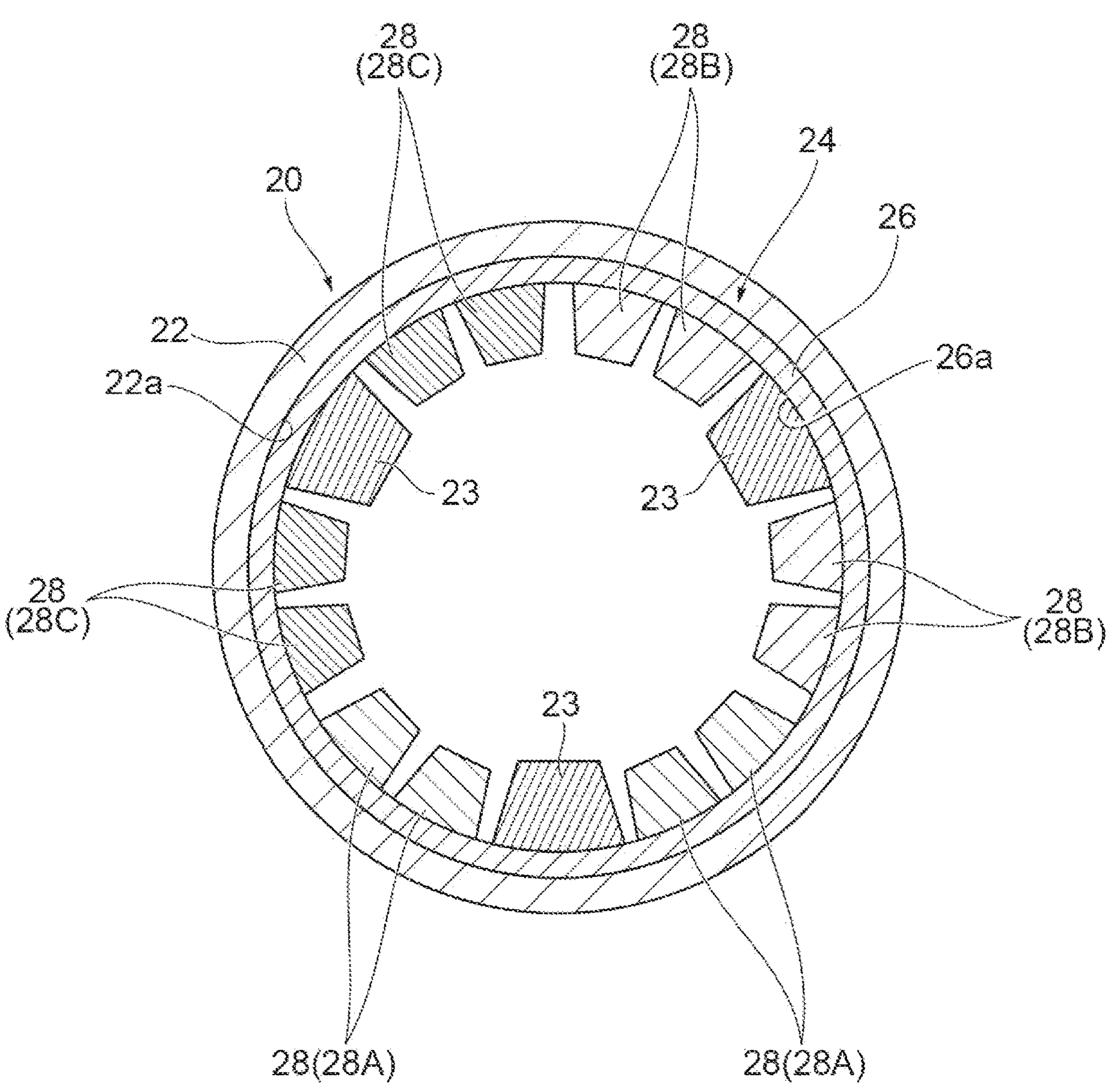
FIG. 7 is a cross-sectional view showing a different embodiment.

Further, as shown in FIG. 5, teeth 23 may be provided on the inner surface 22*a* of a housing 22B. The teeth 23 rise from the inner surface 22*a* of the housing 22B and is provided integrally with the housing 22B. The teeth 23 are provided in the same number (three in the present embodiment) as the print coil wiring 28A, 28B, and 28C. Each of the print coil wiring 28A, 28B, and 28C is disposed around each of the teeth 23. The height of the teeth 23 is, for example, 10 to 100 μm (15 μm as an example), and may be the same as or higher than the height of the print coil wiring 28. The teeth 23 may be in the form of ribs extending parallel to the print coil wiring 28A, 28B and 28C. According to the configuration shown in FIG. 5, since the magnetic fluxes generated from the print coil wiring 28A, 28B, and 28C are more likely to be concentrated by the teeth 23 made of soft magnetic material, it is possible to realize a higher rotation torque by applying to the motor 1. As shown in FIG. 6, in the form of the flexible printed circuit board 24 in which the print coil wiring 28 is formed, each teeth 23 can be provided so as to penetrate the base material 26. As shown in FIG. 7, in the form of the flexible printed circuit board 24 on which the print coil wiring 28 is formed, the teeth 23 may be provided on the main surface 26*a* of the base material 26.

The teeth may be separate from the housing, or may be made of magnetic material different from the magnetic material forming the housing. For example, the teeth may be formed by screen-printing resin containing magnetic powder, or may be formed by plating nickel. In either case, if the teeth are made of the same material as that of the print coil wiring, the number of steps for manufacturing the stator can be reduced. The housing 22B may be entirely made of soft magnetic material, or may be partially made of non-magnetic material and the remaining part made of soft magnetic material.

As can be seen from the foregoing description, the present specification discloses the following.

[Appendix 1]

A stator used in a motor including a magnetized shaft-shaped rotor and a cylindrical stator, and the rotor is inserted through the stator, the stator comprising:

a cylindrical housing made of a soft magnetic material; and print coil wiring provided on an inner surface of the housing.

[Appendix 2]

The stator according to Appendix 1 further comprising teeth provided on the inner surface of the housing and made of a soft magnetic material, wherein the print coil wiring is disposed around the teeth.

[Appendix 3]

The stator according to Appendix 1 or 2, wherein an internal diameter of the housing is 3 mm or less.

[Appendix 4]

The stator according to any one of Appendixes 1 to 3 further comprising a flexible printed circuit board provided with the print coil wiring, wherein the flexible printed circuit board is attached to the inner surface of the housing.

[Appendix 5]

The stator according to Appendix 4, wherein a thickness of the flexible printed circuit board is 500 μm or less.

[Appendix 6]

The stator according to Appendix 4 or 5, wherein a main component of a base material of the flexible printed circuit board is polyimide resin, PET resin, or LCP resin.

[Appendix 7]

The stator according to any one of Appendixes 4 to 6, wherein a base material of the flexible printed circuit board is made of magnetic powder-containing resin.

1 motor
10 rotor
20 stator
22, 22A, and 22B housing
23 teeth
24 flexible printed circuit board
26 base material
28 and 28A to 28C print coil wiring
28*a* outer end portion of print coil wiring
28*b* inner end portion of print coil wiring.

The invention claimed is:

1. A stator used in a motor including a magnetized shaft-shaped rotor and a cylindrical stator, and the rotor is inserted through the stator, the stator comprising:

a cylindrical housing made of a soft magnetic material;

print coil wiring provided on an inner surface of the housing; and a flexible printed circuit board provided with the print coil wiring, wherein the flexible printed circuit board is attached to the inner surface of the housing, wherein a thickness of the flexible printed circuit board is 500 μm or less.

2. The stator according to claim 1 further comprising teeth provided on the inner surface of the housing and made of a soft magnetic material, wherein the print coil wiring is disposed around the teeth.

3. The stator according to claim 1, wherein an internal diameter of the housing is 3 mm or less.

4. The stator according to claim 1, wherein a main component of a base material of the flexible printed circuit board is polyimide resin, PET resin, or LCP resin.

5. The stator according to claim 1, wherein a base material of the flexible printed circuit board is made of magnetic powder-containing resin.

6. The stator according to claim 1, wherein the thickness of the flexible printed circuit board is in a range from 20 μm to 500 μm.

7. The stator according to claim 1, wherein the flexible printed circuit board includes a based material having a thickness in a range from 5 μm to 100 μm.

8. The stator according to claim 1, wherein the print coil wiring has a thickness in a range from 3 μm to 100 μm.

* * * * *